United States Patent
Maher

[15] 3,703,167
[45] Nov. 21, 1972

[54] TANK HEATER
[72] Inventor: Pat Maher, 65 Grove Avenue, Salt Lake City, Utah 84115
[22] Filed: June 14, 1971
[21] Appl. No.: 152,709

[52] U.S. Cl..............126/350 R, 126/351, 126/362
[51] Int. Cl.....................................F24h 1/00
[58] Field of Search...............126/350, 351, 362

[56] References Cited

UNITED STATES PATENTS

| | | | |
|---|---|---|---|
| 2,190,165 | 2/1940 | Shurts | 126/350 X |
| 2,577,728 | 12/1951 | Alexander | 122/408 |
| 2,806,468 | 9/1957 | McCutchen et al. | 126/362 X |
| 2,884,197 | 4/1959 | Whittell, Jr. | 126/362 X |

*Primary Examiner*—Kenneth W. Sprague
*Attorney*—B. Deon Criddle

[57] ABSTRACT

A heater for stock watering tanks and the like. A heating unit acts on a constantly replenished small volume of water to heat it and to build up a stream pressure that is discharged through openings in a floating tube that extends around the periphery of the tank.

7 Claims, 3 Drawing Figures

PATENTED NOV 21 1972  3,703,167
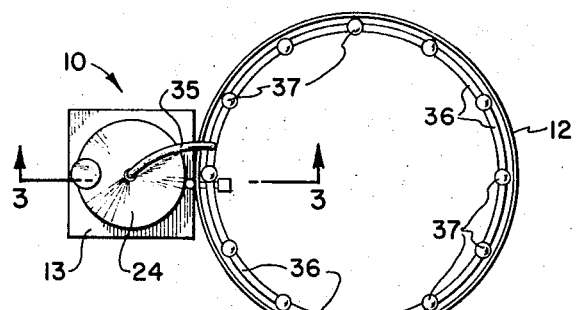
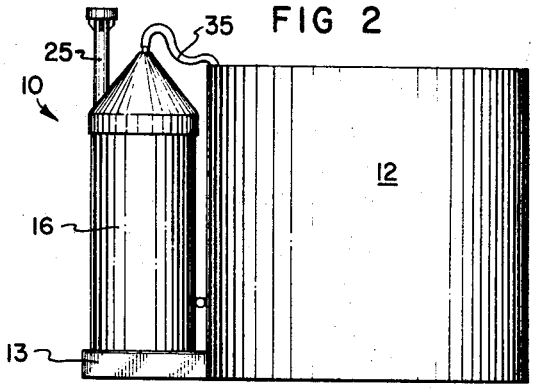
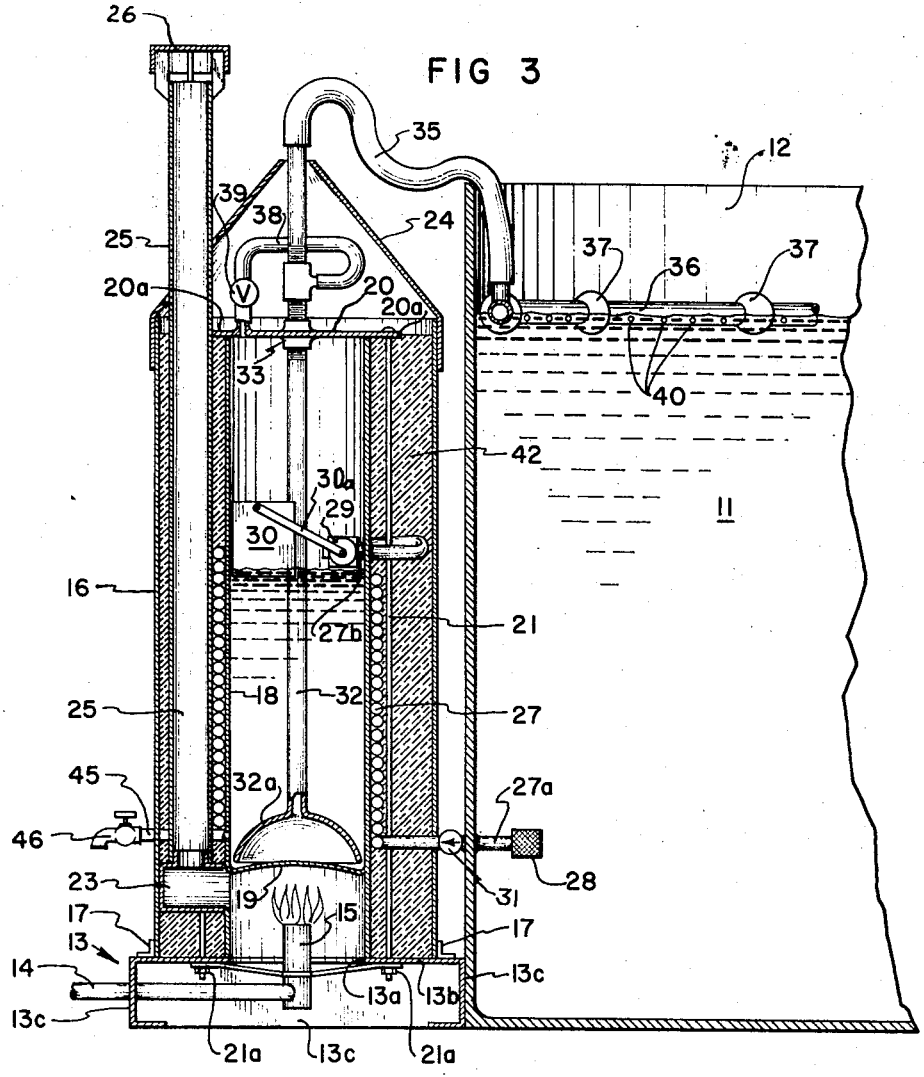
INVENTOR:
PAT MAHER
BY: B. Dean Cardelle
ATTORNEY 3,703,167

TANK HEATER

BRIEF DESCRIPTION OF THE INVENTION

This invention relates to heating devices for water tanks and particularly to such heating devices that are intended to be left unattended for long periods of time and that are intended to keep ice from forming on stock watering troughs. The value of stock tank water heaters has long been recognized. It has either been necessary to heat the water so the animals can drink or to use personnel or machines to break up ice formations. If the animals drink cold water they must use up a great deal of energy in warming the water in their bodies. If the water is warm when they drink this energy can be conserved and over a year's period of time, at current market prices, this energy-savings will result in beef animal that has been drinking warmed water being worth from $3.00 to $6.00 more than one that has been forced to drink icy water throughout a winter season.

PRIOR ART

In the past, a number of water tank heating devices have been proposed. Generally, these are immersion type heaters that are partially or fully submerged into the water in a tank and that generate heat at a burner and that radiates it only to the immediate vicinity of the heater. Since the ice forms on the water at the outer edges first and then freezes towards the center, these immersion heaters have, at best, been able to keep only a very small water area surrounding them free from ice. Of course, a number of the immersion heaters can be spaced around a tank in the outer edge of the water and these may effectively prevent freezing of the water in the tank. However, such an arrangement is expensive, both because of the cost of the heaters themselves and because of the amount of fuel they consume. In addition, this arrangement is quite inefficient since a great deal of sub-surface water is heated unnecessarily and can be dangerous should any of the fuel used inadvertently escape into an animal watering tank.

SUMMARY OF THE INVENTION

Principal objects of the present invention are to provide a tank heater that heats only a minimum amount of water and that then uses the heated water to efficiently warm the zone where freezing begins so that ice will not form in that zone.

Another object is to provide a tank heater that will, when used with an animal watering tank, efficiently keep the zone from which the animals drink free from ice and the water in that zone warmed, whereby the animals drink warmed water.

Principal features of the invention include a heating unit having an inlet coupled to the tank containing water to be heated, pre-warming coils through which water from the inlet travels to a replenishment reservoir in which water is preheated and from which the water moves into a pressure chamber. A burner chamber is beneath and sealed from the pressure chamber and steam developed in the pressure chamber is forced into a discharge tube floating on the water of the tank to be heated.

Additional objects and features will become apparent from the following detailed description and drawings, disclosing what is presently contemplated as being the best mode of the invention.

THE DRAWINGS

In the drawings:

FIG. 1 is a top plan view of a water tank, having the heater of the invention arranged to heat water in the tank;

FIG. 2, a side elevation view; and

FIG. 3, an enlarged vertical section, taken on the line 3—3 of FIG. 1.

DETAILED DESCRIPTION

Referring now to the drawings:

In the illustrated preferred embodiment, the tank heater of the invention is shown generally at 10, and is arranged to heat water 11 in a stock watering tank 12.

The tank heater includes a base 13 having a central opening 13a through the top 13b thereof and downwardly and inwardly turned edges 13c that support the top. A gas inlet pipe 14, connected to a conventional pressurized gas supply source, not shown, extends through one edge 13c to an upstanding burner 15.

A cylindrical housing 16 extends upwardly from base 13 and is secured thereto by telescoping it inside upstanding ears 17 fixed to the top 13b and spaced around central opening 13a.

Another cylindrical housing 18 is positioned concentrically inside housing 16 and around the central opening 13a. A partition 19 shaped to be slightly convex upwardly extends across the housing 18 at a location close to the lower end of the housing and slightly above the top of burner 15, which extends through opening 13a and into the housing 18. A top 20 closes the upper end of housing 18 and has a flange 20a extending beyond the housing.

Bolts 21, spaced around the cylindrical housing 18, extend through the flange 20a and base 13 to receive nuts 21a that are threaded onto the bolts to sealingly clamp the housing 18 to base 13.

A vent elbow 23 has one end connected through the wall of housing 18, above the burner 15 and below partition 19, and its other end facing upwardly, between housing 16 and 18.

A conical cap 24 has its large, flared, bottom end telescoped onto the top end of housing 16, and an exhaust stack pipe 25 is inserted through an opening 24a in the cap 24 to telescope over the upwardly extending end of vent elbow 23. A conventional type wind and rain protector cap 26 fits on the top of stack pipe 25 to keep wind from blowing down through the pipe and to keep water out.

A conduit 27 extends from inside tank 12, through the wall thereof and through the wall of housing 16. The inlet end 27a of conduit 27 has a filter screen 28 thereon and the conduit is coiled upwardly around tank 18 and between the tank 18 and exhaust stack pipe 25. The other end 27b of pipe 25 extends through the wall of tank 16 and has a float controlled valve 29 thereon.

The inlet end of conduit 27 is positioned low in tank 12, so that the water pressure thereabove forces water into the conduit, through a check valve 31a (to prevent reverse flow through conduit 27 should the water level in tank 12 drop to the extent that such reverse flow could otherwise occur), the coils and to the other end 27b of the conduit 27 inside tank 18. End 27b is positioned at a level below the normal water level of water in tank 12, so that water will be gravity fed therethrough from the tank 12.

A float 30, inside tank 18, is connected to the valve 29 by an arm 30a and when the float reaches a predetermined upper level the valve is closed.

Float 30 is guided within the tank 18 by an upstanding steam pipe 32. Pipe 32 is sealingly threaded through a fitting 33 in top 20 of housing 18 and has an upwardly convex, flared lower portion 32a held a small spaced distance away from partition 19.

The upper end of steam pipe 32 extends through the top of cap 24 and has one end of a flexible tube 35 connected thereto. The other end of the flexible tube is connected to a tubular ring 36, which may be constructed of flotable material, such as plastic, or that may be copper tubing or the like, supported on the water surface by spaced floats 37.

A vent tube 38 extends into the top portion of housing 18 through top 20 and a pressure relief valve 39 is provided in the tube, so that if excess pressure builds up in the housing 16 the relief valve will open and the excess pressure will be relieved through valve 39, the tube 38 interconnecting the valve and pipe 32, pipe 32, flexible tube 35 and the ring 36. Small spaced orifices 40 in the ring 36 provide means whereby steam pressure developed inside the ring, as hereinafter described, can be distributed to the surface water in the tank 12.

In operation, the unit is arranged such that the heater 10 is alongside the tank 12. It may be standing alongside, as shown herein, or it may be hung from the upper edge of the tank using any conventional bracket suitable for the purpose. In any event, conduit 27 is connected into the lower portion of the tank and end 27b of the conduit is below the level of water maintained in tank 12.

Water from tank 12 flows into conduit 27, through valve 29 and into housing 18. When the water reaches a predetermined height within the housing 18, float 30 operates through arm 30a to close the valve.

The gas supply line to burner 15 is opened in conventional fashion and the burner is lighted. The burner flame acts against and heats partition 19 and the hot exhaust gases are discharged through vent elbow 23 and stack pipe 25.

The heat applied to partition 19 is transmitted to the water inside housing 18 and acts predominently to heat that water contained within steam pipe 32 and the flared lower portion 32a thereof. The water within the steam pipe is heated until steam is formed and because of the pressure build up resulting from such steam formation, the steam is forced up pipe 32, through ring 36, and out the orifices 40 to the water in the tank.

In the event the water in housing 18, but outside steam pipe 32, becomes hot enough to generate steam within the housing, relief valve 39 will open and the generated steam will pass into steam pipe 32 and then into the tank 12 where it will heat the surrounding water so that it will not freeze.

Valve 29 is operated by float 30 to constantly maintain the desired level of water in housing 18.

As water from tank 12 is passed through the coils in conduit 27 the water is pre-warmed. This is because heat from the water in housing 18 and from the exhaust air in stack pipe 19 is both transmitted to conduit 27 and is transferred to the water in the conduit.

Insulation material 42 is placed between housing 16 and the conduit 27 so that heat radiating from the housing 18 and stack pipe is effectively confined to act on the conduit 27. This preheating makes efficient use of the heat generated and, naturally, reduces the amount of energy necessary to steam formation after the water from conduit 27 is moved into the steam tube 32.

With this invention, it is possible to efficiently heat the zones of a water tank most subject to freezing and most used for drinking by animals. While a floating ring 36 has been here disclosed as being a preferred system of distributing generated steam to a tank, other shapes of distribution systems could be used. Floating, perforated straight tubes or rectangularly arranged tubes could be used, for example. Also, while housings 16 and 18 have been disclosed as being of circular cross-sectional configuration, other shapes could as well be employed. Similarly, while a gas fired burner has been disclosed, other types of heating units can be used.

A discharge spout 45 extends from inside housing 18, at the bottom thereof, to the exterior of housing 16, and a valve 46 in the spout controls flow therethrough. The spout allows water to be drained from housing 18 as and when necessary.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A tank heating comprising
a closed housing having a top and a bottom;
a burner compartment beneath the bottom of the housing;
heat generating means in the burner compartment for heating the bottom of the housing;
inlet means adapted to connect the interior of the housing with the interior of a water tank at a level below the level of water maintained in the water tank;
means responsive to the level of water in the housing to regulate flow through the inlet means into the housing;
a steam pipe extending upwardly through the top of the housing from a flared, upwardly convex section located at the lower end thereof and spaced slightly above the bottom of the housing;
a steam distribution means adapted to float on water in the tank and having spaced orifices therethrough; and
means interconnecting the top of the steam pipe and the distribution means, whereby steam generated in the steam pipe is forced into said distribution means and out the spaced orifices.

2. A tank heater as in claim 1, wherein the inlet means includes a conduit extending from a location adjacent to the bottom of the housing, coiling upwardly around the housing and extending into the housing at a level above the bottom of the housing.

3. A tank heater as in claim 2, further including
a vent stack pipe extending from the burner chamber upwardly beyond the top of the housing, said stack pipe being closely adjacent to the coils of the inlet conduit.

4. A tank heater as in claim 3, further including a second housing surrounding said first housing, the vent stack pipe and the coils of the inlet means; and insulation material between the wall of the second housing and the coils.

5. A tank heater as in claim 3, further including a relief conduit connecting the top interior of the first housing exteriorly of the steam pipe to the steam pipe; and a pressure relief valve in the relief conduit.

6. A tank heater as in claim 5, wherein the distribution means comprises a ring adapted to float on the surface of the water and having spaced orifices therearound.

7. A tank heater as in claim 6, wherein the heat generating means comprises a gas burner.

* * * * *